(12) United States Patent
Quettier

(10) Patent No.: US 9,353,193 B2
(45) Date of Patent: May 31, 2016

(54) METHOD FOR PREPARING ACETYLATED DERIVATIVES OF AN AMYLACEOUS MATERIAL

(75) Inventor: Claude Quettier, Lambersart (FR)

(73) Assignee: ROQUETTE FRERES, Lestrem (FR)

( * ) Notice: Subject to any disclaimer, the term of this patent is extended or adjusted under 35 U.S.C. 154(b) by 170 days.

(21) Appl. No.: 13/500,689

(22) PCT Filed: Oct. 11, 2010

(86) PCT No.: PCT/FR2010/052147
§ 371 (c)(1),
(2), (4) Date: Apr. 6, 2012

(87) PCT Pub. No.: WO2011/042677
PCT Pub. Date: Apr. 14, 2011

(65) Prior Publication Data
US 2012/0208897 A1    Aug. 16, 2012

(30) Foreign Application Priority Data
Oct. 9, 2009    (FR) .................................. 09 57083

(51) Int. Cl.
*C08B 31/04*    (2006.01)
*C08L 3/06*    (2006.01)

(52) U.S. Cl.
CPC ...................... *C08B 31/04* (2013.01)

(58) Field of Classification Search
CPC .............. C08L 3/02; C08L 3/04; C08B 31/04
See application file for complete search history.

(56) References Cited

U.S. PATENT DOCUMENTS

| | | | |
|---|---|---|---|
| 2,362,282 A | 11/1944 | Lindsay | |
| 3,549,619 A | 12/1970 | Mark et al. | |
| 3,553,196 A | 1/1971 | Mark et al. | |
| 3,795,670 A | 3/1974 | Mark et al. | |
| 5,367,067 A | 11/1994 | Frische et al. | |
| 5,714,601 A | 2/1998 | Tanaka et al. | |
| 2006/0034997 A1* | 2/2006 | Carver et al. | ................. 426/589 |
| 2008/0146792 A1* | 6/2008 | Wang et al. | ................. 536/107 |

FOREIGN PATENT DOCUMENTS

| | | |
|---|---|---|
| CN | 101362804 | 2/2009 |
| DE | 19827312 | 12/1999 |
| DE | 19924772 | * 11/2000 |
| EP | 0859012 | 8/1998 |
| GB | 09868 | 7/1903 |
| JP | 2005194412 | 7/2005 |
| WO | WO 93/22362 | 11/1993 |
| WO | WO 97/02018 | 1/1997 |
| WO | WO 97/03121 | 1/1997 |
| WO | WO 2004/104048 | 12/2004 |
| WO | WO 2007/065681 | 6/2007 |

OTHER PUBLICATIONS

Komiyama et al., JP 2006-345875, published: Dec. 28, 2006, English machine-translation downloaded on Mar. 10, 2014.*
Rolf, K. et al. DE 19924772, published: Nov. 30, 2000; English Machine translation accessed on Mar. 9, 2015.*
Database, Accession No. 2005-536464, XP002583807, Jul. 21, 2005, pp. 1-2.
Written Opinion in International Application No. PCT/FR2010/052147, Feb. 21, 2011, pp. 1-7.

* cited by examiner

*Primary Examiner* — Ali Soroush
*Assistant Examiner* — Genevieve S Alley
(74) *Attorney, Agent, or Firm* — Saliwanchik, Lloyd & Eisenschenk

(57) ABSTRACT

The present invention relates to a continuous method for preparing acetylated derivatives of an amylaceous material. The invention also relates to a solid composition of at least one acetylated derivative of an amylaceous material obtained by means of said method. The invention finally relates to the use of such a composition to prepare thermoplastic, elastomeric, adhesive, pharmaceutical and/or ink compositions.

18 Claims, No Drawings

METHOD FOR PREPARING ACETYLATED DERIVATIVES OF AN AMYLACEOUS MATERIAL

This application is the U.S. national stage application of International Patent Application No. PCT/FR2010/052147, filed Oct. 11, 2010.

The present invention relates to a continuous method for preparing acetylated derivatives of an amylaceous material. It also relates to a solid composition of at least one acetylated derivative of an amylaceous material obtained by means of said method. Finally, it relates to the use of such a composition to prepare thermoplastic, elastomeric, adhesive, pharmaceutical, food and/or ink compositions.

Starch is a mixture of 2 polymers, amylose and amylopectin, composed of D-glucose units linked to one another via α-(1-4) and α-(1-6) linkages, the latter being responsible for the branches in the structure of the molecule. Amylose is a relatively linear glucose polymer, whereas amylopectin is a branched polymer. The ratio between the amounts of the two types of polymers depends on the source of the starch.

Acetylated derivatives of an amylaceous material are used in various fields, in particular in food products, pharmaceutical products, fibers, filaments and thermoplastics. Their physical and functional properties depend in particular on their degree of substitution with acetylated groups (DS). The expression "degree of substitution with acetylated groups" (DS) is intended to mean, in the present invention, the average number of acetylated groups per glucose unit constituting the amylaceous material.

The solubilization of acetylated derivatives of an amylaceous material depends in particular on their DS. Thus, slightly acetylated amylaceous derivatives are not soluble in solvents such as acetic acid.

Methods for preparing acetylated derivatives of an amylaceous material conventionally include esterification of all or part of the free hydroxyl groups of the starch with acetic acid or acetic anhydride.

At the beginning of the esterification step, the amylaceous derivatives have a zero or low DS and are therefore in suspension in a solvent. For the purpose of the present invention, the term "suspension" is intended to mean any heterogeneous dispersion of acetylated derivatives of an amylaceous material in the granular state in a solvent. During the esterification step, the DS of said amylaceous derivatives increases. Above a threshold DS, the amylaceous acetylated derivatives then become soluble in solvents such as acetic anhydride and/or acetic acid. This results in a viscous homogeneous solution called "adhesive phase". For the purpose of the present invention, the term "adhesive phase" or "adhesive of an amylaceous material" is intended to mean any homogeneous solution of starch acetate in a solvent, said solvent preferentially being acetic anhydride and/or acetic acid.

The esterification step is followed by an acetylated derivative recovery step.

This acetylated derivative recovery step is conventionally carried out by precipitation from water or another solvent. By way of example, patent U.S. Pat. No. 4,501,888 describes a method for obtaining acetylated derivatives of starch involving esterification of the starch with acetic anhydride, in which the ester is recovered by precipitation from water.

The precipitation of the acetylated derivatives produces an acetic acid-rich effluent which also comprises other entities, in particular the solvent from which the precipitation is carried out. The acetic acid can be recovered from the effluent only after several operations, for example after a triple distillation operation. Furthermore, the use of solvents that are often expensive or toxic, in the precipitation step, creates a high cost, both economically and environmentally, for the production of the acetylated derivatives of the amylaceous materials and is capable of leaving traces of harmful substances in the final products.

The replacement of the precipitation step with an evaporation step in a method for preparing acetylated derivatives of an amylaceous material makes it possible to produce effluents that are richer in acetic acid. The acetic acid is more easily recovered from the effluent, and therefore more easily recycled.

The partial evaporation of acetic acid in a method for preparing acetylated derivatives of an amylaceous material therefore consists of a very advantageous alternative to precipitation.

By way of example, patent application WO 2004/104048 describes a method for obtaining acetylated derivatives of starch involving esterification of the starch with a combination of acetic acid and betaine salt, in which the ester is recovered by partial distillation and then precipitation from ethanol. The starch acetate described in said document has a low DS, much lower than 1. The starch acetate is therefore in suspension in the acetic acid/betaine salt mixture. In a suspension of amylaceous acetylated derivatives, distillation, even virtually complete distillation, of the acetic acid does not pose any particular problem for those skilled in the art.

In addition to application WO 2004/104048, such a distillation of a suspension of amylaceous acetylated derivatives is also described in documents WO 2007/065681, GB 09868 A A.D. 1902, and U.S. Pat. No. 2,362,282.

However, when the amylaceous acetylated derivatives have a high DS, it has, to the applicant's knowledge, never been possible up until now to carry out virtually complete evaporation of the acetic acid trapped in the adhesive phase, in a continuous method for preparing acetylated derivatives of an amylaceous material. Thus, the replacement of the precipitation step with a single evaporation step in a continuous method for preparing acetylated derivatives of an amylaceous material has up until now never made it possible to obtain said acetylated derivatives in solid form, in the form of a powder.

By way of example, document WO 97/02018 describes a method for acetylation-succinylation of starch in glacial acetic acid and acetic anhydride. At the end of the esterification, which results in the preparation of an amylaceous acetylated derivative with a high DS (DS greater than 2), the excess acetic acid is evaporated off under vacuum. However, it is, in this case, a partial distillation which does not allow final recovery of an amylaceous acetylated derivative in solid form. The partial distillation is therefore followed by a step of precipitation of the amylaceous derivative from water.

Document WO 97/03121 describes a method for acetylation of starch with acetic anhydride. The acetic acid and the anhydride optionally in excess are evaporated off under partial vacuum, and then the residual acetic acid is removed by entrainment with nitrogen provided by sparging. Again in this case, the amylaceous acetylated derivative is not recovered in the form of a solid powder, but in a mixture with esters of glycerol and of acetic acid, in such a way that said mixture has a liquid consistency, suitable for sparging with nitrogen.

From all the aforementioned, it follows that there is an unmet need for a method for preparing acetylated derivatives of an amylaceous material with a DS at least greater than or equal to 1.6, which is free of any precipitation step and is such that a single acetic acid evaporation step results in the recovery of said acetylated derivatives of an amylaceous material with a high DS, in the form of a solid powder.

The present invention relates to a continuous method for preparing acetylated derivatives of an amylaceous material which includes an evaporation step instead of the precipitation step described in conventional methods. This replacement allows an improvement in the technical, economical and environmental challenges of the method, and thus promotes implementation thereof at the industrial level.

DETAILED PRESENTATION OF THE INVENTION

The first subject of the present invention is a continuous method for preparing a solid composition of an aceylated derivative of an amylaceous material, comprising the following steps:
a) a step in which a reaction for acetylation of the amylaceous material with acetic anhydride and/or acetic acid is carried out in the presence of a catalyst, so as to obtain a reaction medium in the form of an adhesive of an acetylated amylaceous material,
b) an optional step of neutralization of said catalyst,
c) a step of evaporation of the reaction medium in particular with a view to solidifying said reaction medium, and
d) a step of recovery of the reaction medium thus depleted of acetic acid and solidified.

During this research, the applicant has noted that the threshold DS above which the acetylated derivatives of an amylaceous material are soluble in the acetic acid and/or acetic anhydride corresponds to a DS at least greater than 1.6.

For the purpose of the present invention, the term "amylaceous material" is intended to mean in particular granular starches, hydrosoluble starches and organomodified starches.

According to a first variant, the starch selected as an amylaceous material is a granular starch. The term "granular starch" is intended to mean herein a native starch or a physically, chemically or enzymatically modified starch, which has conserved, within the starch granules, a semicrystalline structure similar to that found in starch grains naturally present in storage organs and tissues of higher plants, in particular in cereal seeds, leguminous plant seeds, potato or cassava tubers, roots, bulbs, stems and fruits. This semicrystalline state is essentially due to the macromolecules of amylopectin, which is one of the two main constituents of starch. In the native form, the starch grains have a degree of crystallinity which ranges from 15 to 45% and which depends essentially on the botanical origin of the starch and on the optional treatment to which it is subjected.

Granular starch, placed under polarized light, has a characteristic black cross, known as a maltese cross, which is typical of the granular form.

According to the invention, the granular starch may originate from any botanical source, including a granular starch rich in amylose or, conversely, rich in amylopectin (waxy). It may be native starch of cereals such as wheat, corn, barley, triticale, sorgon or rice, of tuberous plants such as potato or cassava, or of leguminous plants such as pea, and mixtures of such starches.

The granular starch may be a starch that has been hydrolyzed via an acidic, oxidative or enzymatic root, or an oxidized starch. It may be a starch commonly known as fluidized starch or a white dextrin.

It may also be a starch that has been physicochemically modified but that has essentially retained the structure of the starting native starch, especially such as esterified and/or etherified starches, in particular modified by acetylation, hydroxypropylation, cationization, crosslinking, phosphatation or succinylation, or starches treated in an aqueous medium at low temperature ("annealing"). Preferably, the granular starch is a native, hydrolyzed, oxidized or modified starch, in particular of corn, wheat, potato or pea.

The granular starch generally has a content of matter that is soluble at 20° C. in demineralized water of less than 5% by mass. It is preferably virtually insoluble in cold water.

According to a second variant, the starch selected as an amylaceous material is a hydrosoluble starch, which may also originate from any botanical source, including a hydrosoluble starch that is rich in amylose or, conversely, rich in amylopectin (waxy). This hydrosoluble starch may be introduced in partial or total replacement for the granular starch.

For the purpose of the invention, the term "hydrosoluble starch" is intended to mean any amylaceous material having at 20° C. and with mechanical stirring for 24 hours a fraction that is soluble in demineralized water at least equal to 5% by weight. This soluble fraction is preferably greater than 20% by weight and in particular greater than 50% by weight. Of course, the hydrosoluble starch may be totally soluble in demineralized water (soluble fraction=100%), The hydrosoluble starch may be advantageously used according to the invention in solid form, preferably with a low water content, generally of less than 10%, in particular less than 5% by weight, and better still in solid form with a water content of less than 2.5% by weight, including in substantially anhydrous form (water content of less than 0.5%, or even 0.2%, by weight).

Such hydrosoluble starches may be obtained by pregelatinization on a drum, by pregelatinization on an extruder, by atomization of an amylaceous suspension or solution, by precipitation with a nonsolvent, by hydrothermal cooking, by chemical functionalization or the like. It is in particular a pregelatinized, extruded or atomized starch, a highly transformed dextrin (also known as yellow dextrin), a maltodextrin, a functionalized starch or any mixture of these products.

Pregelatinized starches can be obtained by hydrothermal gelatinization treatment of native starches or of modified starches, in particular by steam cooking, jet-cooking, cooking on a drum, cooking in blender/extruder systems followed by drying, for example in an oven, with hot air on a fluidized bed, on a rotating drum, by atomization, by extrusion or by lyophilization. Such starches generally have a solubility in demineralized water at 20° C. of greater than 5% and more generally between 10 and 100%, and a degree of starch crystallinity of less than 15%, generally less than 5% and most commonly less than 1%, or even zero. By way of example, mention may be made of the products manufactured and sold by the applicant under the brand name PREGEFLO®, The hydrosoluble starch may also consist of a starch which has retained its granular structure, obtained by atomization cooking, generally known as GCWS (Granular Cold Water Soluble) starch.

Highly transformed dextrins can be prepared from native or modified starches, by dextrinification in a sparingly hydrated acidic medium. They may in particular be soluble white dextrins or yellow dextrins. By way of example, mention may be made of the products STABILYS® A 053 or TACKIDEX® C 072 manufactured and sold by the applicant. Such dextrins have, in demineralized water at 20° C., a solubility generally of between 10 and 95% and a starch crystallinity of less than 15% and generally less than 5%.

Maltodextrins can be obtained by acid, oxidative or enzymatic hydrolysis of starches in an aqueous medium. They may in particular have a dextrose equivalent (DE) of between 0.5 and 40, preferably between 0.5 and 20 and even better still between 0.5 and 12. Such maltodextrins are, for example, manufactured and sold by the applicant under the trade name GLUCIDEX® and have a solubility in demineralized water at 20° C. generally of greater than 90% or even close to 100%, and a starch crystallinity generally of less than 5% and usually virtually zero.

Preferably, the starch modification or functionalization reagents are of renewable origin.

According to another advantageous variant, the hydrosoluble starch is a hydrosoluble starch from corn, wheat, potato or pea or a hydrosoluble derivative thereof.

Furthermore, it advantageously has a low water content, generally of less than 10%, preferably less than 5%, in particular less than 2.5% by weight and ideally less than 0.5%, or even less than 0.2% by weight.

According to a third variant, the selected amylaceous material used according to the invention is an organomodified and preferably organosoluble starch, which may also originate from any botanical source, including an organomodified and preferably organosoluble starch that is rich in amylose or, conversely, rich in amylopectin (waxy). This organosoluble starch may be introduced in partial or total replacement of the granular starch or of the hydrosoluble starch.

For the purpose of the invention, the term "organomodified starch" is intended to mean any amylaceous component other than a granular starch or a hydrosoluble starch according to the definitions given above. Preferably, this organomodified starch is virtually amorphous, i.e. has a degree of starch crystallinity of less than 5%, generally less than 1% and in particular zero. It is also preferably "organosoluble", i.e. it has, at 20° C., a fraction that is soluble in a solvent chosen from ethanol, ethyl acetate, propyl acetate, butyl acetate, diethyl carbonate, propylene carbonate, dimethyl glutarate, triethyl citrate, dibasic esters, dimethyl sulfoxide (DMSO), dimethylisosorbide, glyceryl triacetate, isosorbide diacetate, isosorbide dioleate and methyl esters of vegetable oils, at least equal to 5% by weight. This soluble fraction is preferably greater than 20% by weight and in particular greater than 50% by weight. Of course, the organosoluble starch may be totally soluble in one or more of the solvents indicated above (soluble fraction=100%).

The organomodified starch may be used according to the invention in solid form, including a form with a relatively low water content, namely less than 10% by weight. It may especially be less than 5%, in particular less than 2.5% by weight and ideally less than 0.5%, or even less than 0.2% by weight.

The organomodified starch that can be used according to the invention may be prepared via high functionalization of native or modified starches such as those presented above. This high functionalization may, for example, be performed by esterification or etherification to a level that is sufficiently high to make it essentially amorphous and to give it insolubility in water and preferably solubility in one of the above organic solvents. Such functionalized starches have a soluble fraction, as defined above, of greater than 5%, preferably greater than 10% and even better still greater than 50%.

The high functionalization may be obtained in particular by grafting, for example in a solvent phase, or by reactive extrusion, of acid anhydrides, of mixed anhydrides, of fatty acid chlorides, of caprolactone or lactide oligomers, hydroxypropylation and crosslinking in the adhesive phase, cationization and crosslinking in the dry phase or in the adhesive phase, anionization by phosphation or succinylation and crosslinking in the dry phase or in the adhesive phase, silylation, or telomerization with butadiene.

According to another advantageous variant, the organomodified starch is an organomodified starch from corn, wheat, potato or pea or an organomodified derivative thereof.

Detailed Description of the Steps of the Method According to the Invention

Step a)

Step a) corresponds to the acetylation of the amylaceous material with acetic anhydride and/or acetic acid. This step is carried out in the presence of a catalyst for the acetylation reaction so as to obtain a DS in the region of x, x being a number between 1.6 and 3, preferentially between 2 and 3, more preferentially between 2.3 and 3, and even more preferentially between 2.5 and 3. Thus, at the end of step a), the starch acetate is in the adhesive phase.

Among the catalysts that can be used in step a), mention may be made of acid catalysts such as methanesulfonic acid and sulfuric acid or those mentioned in patent application WO 1997/26281 and EP 0204353, and basic catalysts such as sodium hydroxide (for example in the form of a 50% aqueous solution), sodium acetate or those cited in patent WO 1995/040083.

Preferably, the catalyst involved in step a) is methanesulfonic acid or sodium acetate.

The proportions of the reagents involved in step a) depend on the degree of substitution with acetyl groups DS desired for the ester.

Step a) is carried out in the presence of n equivalents of acetic anhydride (or acid) relative to the amount of amylaceous material, so as to obtain a DS in the region of x, x being a number between 1.6 and 3, preferentially between 2 and 3, more preferentially between 2.3 and 3, and even more preferentially between 2.5 and 3. Thus, at the end of step a), the starch acetate is in the adhesive phase.

In addition, step a) is carried out under one, preferably all, of the following conditions:
  in the presence of from 0.0002 to 0.50 molar equivalent of catalyst relative to the amount of amylaceous material calculated in moles of anhydroglucose;
  at a setpoint temperature of between 80 and 135° C., for a reaction at atmospheric pressure (open reactor);
  for a period ranging from 5 seconds to 10 hours starting from the moment the setpoint temperature is reached.

Moreover, the amounts specified above correspond to the situation in which the amylaceous material is totally anhydrous. When it comprises a non-zero percentage of water, said percentage must be taken into account in calculating the amounts involved, in particular insofar as the water will hydrolyze part of the acetic anhydride. Knowing the proportion of water in the starch, those skilled in the art are in a position to adjust the amounts of each reagent in order to compensate for the presence of the water.

Those skilled in the art are in a position to modify the temperature ranges described in the present invention for a given pressure in order to reproduce similar conditions under different pressure conditions.

Step b)

Step b) corresponds to the neutralization of the catalyst. When an acid catalyst has been used in step a), it is advantageous to neutralize it in order to avoid or limit any subsequent degradation of the acetylated amylaceous material, in particular during evaporation step c).

The neutralization of the catalyst can be carried out in particular by adding a slightly less than stochiometric amount or slightly more than stochiometric amount of a basic compound to the reaction medium.

Preferably, step b) is carried out under one, preferably all, of the following conditions:
  in the presence of an amount greater than or equal to 0.8 molar equivalent of neutralization reagent, preferentially an amount of from 1.0 to 1.2 molar equivalents of neutralization reagent (for example sodium acetate when the catalyst is methanesulfonic acid), relative to the amount of catalyst;

under the same temperature and pressure conditions as step a);

for a period ranging from 30 seconds to 10 hours starting from the moment the neutralization reagent is added, depending on the viscosity of the medium and on the ability to obtain a homogeneous dispersion.

Steps a) and b) are carried out in thermostatic reactors which have a stirring system which makes it possible to prevent the formation of dead zones, i.e. zones where there is little or no stirring.

According to one preferred embodiment of the present invention, at least two thermostatic reactors are used alternately for carrying out the continuous method for preparing acetylated derivatives of an amylaceous material such that the reactor-blender-evaporator(s) used in step c) is (are) continuously fed.

Step c)

Step c) corresponds to the evaporation of the reaction medium. This step is carried out in one or more continuously fed reactor-blender-evaporator(s) as described in detail hereinafter. It is the key step of the process since it makes it possible to remove all or part of the acetic acid present in the reaction medium which is, at the end of step b), an adhesive of an acetylated amylaceous material. The acetic acid is present in the reaction medium at this stage of the method in particular as a solvent for the acetylated amylaceous material originating from an initial addition as acetylation solvent or reagent in excess.

The nature of the reaction medium subjected to evaporation step c) is important for the implementation of the present invention. The optionally neutralized reaction medium which is subjected to step c) is in the form of an adhesive of an acetylated amylaceous material of which the DS is between 1.6 and 3 (limits included), preferentially between 2 and 3, more preferentially between 2.3 and 3, and even more preferentially between 2.5 and 3. Said reaction medium subjected to step c) also advantageously has a proportion of dry matter greater than 10%, preferably greater than 20%, and even more preferentially greater than 40% by weight of the total reaction mixture. The term "dry matter" is intended to mean herein the solid matter remaining after evaporation of the solvent, said solvent consisting very predominantly, or even exclusively, of acetic acid and, optionally, of traces of water or of acetic anhydride.

Advantageously, the evaporation of the solvent consisting predominantly, or even exclusively, of acetic acid is carried out under reduced pressure. During this evaporation, the reaction medium is depleted of solvent until it has a solid consistency. The reaction medium then takes the form of a powder at the end of step c).

This depletion of solvent is carried out under temperature and pressure conditions so as to be below the glass transition temperature of the product undergoing solidification.

Step c) can in particular be carried out at a pressure of between 0.001 and 1 bar, preferably between 0.01 and 0.5 bar and even more preferentially between 0.02 and 0.25 bar.

Preferably, step c) is carried out at a temperature of between 20 and 140° C., preferentially between 20 and 120° C., in particular under pressure conditions as described above.

Step d)

Step d) corresponds to the final and continuous recovery of the solid composition of an acetylated amylaceous material resulting from step c), namely from the reaction medium, optionally neutralized, depleted of acetic acid and solidified.

For the purpose of the present invention, the term "depleted of acetic acid" is intended to mean a reaction medium containing less than 10% by weight of acetic acid, preferentially less than 5% of acetic acid, more preferentially less than 2% and even more preferentially less than 1%.

For the purpose of the present invention, the term "solidified reaction medium" is intended to mean a solid composition of an acetylated amylaceous material in powder form.

Step d) may include at least one step, in particular of milling, washing and/or drying the solid composition of an acetylated amylaceous material resulting from step c).

Reactors and Reactor-Blender-Evaporators

The reactor(s) used to implement step a) and, optionally, step b) of the method of the present invention must advantageously have a stirring system which makes it possible to prevent the formation of dead zones, i.e. zones where there is little or no stirring. Such devices are known as such, for example in the polymer processing field.

Of course, those skilled in the art will be able to choose the appropriate stirring power of the reactor according to the viscosity of the initial reaction mixture in order to prevent any possible blocking of the stirring system, setting of the reaction medium and, finally, stopping of the reaction.

The reactors used for implementing step a) and, optionally, step b) may be apparatuses which operate batchwise, in batches, for instance reactors fitted with propeller, helicoid, screw or anchor stirrers, horizontal ribbon or blade mixers, turbine or counter-movement mixers, planetary mixers and kneaders, sigma-blade or Z-blade blenders and internal blenders. Such mixers that can be used for a batch method are described, for example, in the article by G. Delaplace and R. Guérin, entitled "*Mélange des produits pâteux—Caractéristiques d'un système agité*" ["Mixing of pasty products—characteristics of a stirred system"] (Techniques de l'Ingénieur [Techniques of the Engineer], March 2006, F3350), or in the chapter "*Mixing of Highly Viscous Media*", by D. B. Todd, Ullmann's Encyclopedia of Industrial Chemistry, $6^{th}$ edition, 2003, pages 189-205.

According to one preferred embodiment of the present invention, at least two thermostatic reactors are used alternately for carrying out the continuous method for preparing acetylated derivatives of an amylaceous material such that the reactor-blender-evaporator(s) used in step c) is (are) fed continuously.

According to the advantageous embodiment of the present invention, a reactor-blender-evaporator is used to carry out step c) and, optionally, step d), said reactor-blender-evaporator being a horizontal mixer, for example a cylindrical, uniaxial mixer with a shaft fitted with at least two blades shaped like plowshares, such as those sold by the company Lôdige. Such a horizontal mixer may also comprise other stirring means attached to the shaft, for example scrapers, knives or other forms of blades, optionally with a complex structure, such as the Isomix R blades from the company Lôdige. Such horizontal plowshare mixers make it possible to continuously scrape the surface of the cylindrical reactor in such a way as to limit or even prevent the formation of dead zones. It is also possible to use horizontal uniaxial or biaxial mixers with axles bearing stirring and mixing means other than blades shaped like plowshares, for example disks, bars, scrapers or knives. When biaxial mixers are used, the two shafts can rotate in the same direction or in opposite directions. The horizontal mixers can also operate continuously when they are integrated into an appropriate production line.

Such horizontal mixers are sold, for example, by the company List AG and described in patents and patent applications U.S. Pat. No. 6,039,469, US 2004/0114460, US 2004/0145964, US 2006/0193197 and EP 1 127 609.

In one particularly advantageous embodiment, the method uses in continuous mode, as reactor-blender-evaporator, a uniaxial horizontal mixer with blades shaped like plowshares, or else a biaxial horizontal mixer with mixing disks and/or bars.

Any intermediate milling step between steps c) and d) of the method according to the invention can be carried out in the same chamber (blender-evaporator) or, conversely, in a chamber other than that in which step c) was carried out.

The method may also comprise, between steps c) and d), a first intermediate milling step carried out in the same chamber (blender-evaporator) as that in which step c) was carried out, then at least one second intermediate milling step carried out in a chamber other than that in which step c) was carried out.

The chamber (blender-evaporator) in which step c), optionally step d) and/or any intermediate milling step of the method according to the invention is carried out is advantageously fitted with stirring means that have a horizontal rotational axis, and/or are designed so as to scrape the wall of the chamber.

Said chamber may in particular be a uniaxial or biaxial chamber fitted with blades, in particular shaped like disks or a plowshare, and with mixing or blending components, in particular in the form of bars.

Derivatives and Compositions

The acetylated derivative of an amylaceous material obtained by means of the method according to the invention advantageously has a degree of substitution with acetyl groups (DS) of between 1.6 and 3 (limits included), preferentially between 2 and 3, more preferentially between 2.3 and 3, and even more preferentially between 2.5 and 3.

The applicant has observed that the method according to the invention makes it possible to obtain solid compositions of an acetylated derivative of an amylaceous material having novel and generally advantageous characteristics in comparison with those exhibited by the solid compositions of the same nature obtained according to the conventional methods not implementing any evaporation step c) as described above, but rather a step of precipitation from water or another solvent.

These characteristics concern in particular criteria of:
density (aerated bulk density and/or packed bulk density),
packing,
flowability,
angle of repose and/or fall,
specific surface area.

According to one particular embodiment of the invention, the solid composition of an acetylated derivative of an amylaceous material resulting from the method has:
an aerated bulk density greater than 0.4, preferably greater than 0.45 and/or
a packed bulk density greater than 0.5, preferably greater than 0.55.

More preferentially, the solid composition of an acetylated derivative of an amylaceous material according to the invention has a degree of substitution with acetylated groups (DS) of greater than 1.6 and:
an aerated bulk density of between 0.4 and 0.8, preferentially between 0.45 and 0.8, even more preferentially between 0.55 and 0.7, and/or
a packed bulk density of between 0.5 and 0.9, preferentially between 0.55 and 0.85, even more preferentially between 0.6 and 0.8.

Another subject of the present invention is a solid composition of an acetylated derivative of an amylaceous material which has a degree of substitution with acetyl groups (DS) of between 2.5 and 3 and an aerated bulk density greater than 0.4, preferably greater than 0.45 and/or a packed bulk density greater than 0.5, preferably greater than 0.55.

This aerated bulk density and this packed bulk density are measured on the device called "POWDER CHARACTERISTICS TESTER" sold by HOSOKAWA IRON WORKS, LTD. according to the protocol described in the instruction manual supplied with said device.

These densities are generally greater than those observed for solid compositions of the same nature obtained according to the conventional methods not implementing any evaporation step c) as described above, but rather a step of precipitation from water or another solvent, hence an improvement in the conditions for using, in particular transporting, handling, assaying and packaging the compositions according to the invention compared with those of the prior art.

According to one particular embodiment of the invention, the solid composition of an acetylated derivative of an amylaceous material resulting from the method has a specific surface area of between 0.1 and 1.0 $m^2/g$, preferentially between 0.2 and 0.9 $m^2/g$, even more preferentially between 0.2 and 0.8 $m^2/g$.

According to the invention, the specific surface area of a product is determined by means of a BECKMAN-COULTER specific surface area analyzer, of SA3100 type, based on a test for absorption of nitrogen gas on the specific surface area of the product subjected to the analysis, according to the technique described in the article BET Surface Area by Nitrogen Absorption by S. BRUNAUER et al. (Journal of American Chemical Society, 60, 309, 1938). The BET analysis is carried out at low temperature (in a liquid nitrogen bath) and at 3 points.

According to one particular embodiment of the invention, the solid composition of an acetylated derivative of an amylaceous material resulting from the method has a flow time, evaluated according to a test A, of between 2 and 10 seconds, preferentially between 2 and 8 seconds, even more preferentially between 3 and 7 seconds.

The test A consists of a standardized test described in the European Pharmacopea Handbook, $5^{th}$ edition, volume 1, pp. 257-258, "2.9.16. Flowability". Briefly, the test A is intended to determine the ability of divided solids to flow vertically under defined conditions. The apparatus used consists of a funnel with an angle of 60° C. and a diameter of 125 mm as described in figure 2.9.19-2 of the European Pharmacopea. The dried funnel is maintained upright and its flow orifice is blocked by suitable means. A test sample of 100 g of product is introduced without compacting it. The flow orifice is then unblocked and the time needed for the entire test sample to flow out of the funnel is measured. Three different determinations are carried out. The flowability is expressed in seconds, related to 100 g of test sample.

According to one particular embodiment of the invention, the solid composition of an acetylated derivative of an amylaceous material resulting from the method, with a particle size of between 100 and 500 µm, has a packing of between 2 and 12%, preferentially between 3 and 11%, even more preferentially between 5 and 11%.

The packing is calculated from the aerated bulk density and packed bulk density, measured on the device called "POWDER CHARACTERISTICS TESTER" sold by HOSOKAWA IRON WORKS, LTD. as described previously, according to the following formula:

Packing (%)=[(packed bulk density−aerated bulk density)/aerated bulk density]×100.

According to one particular embodiment of the invention, the solid composition of an acetylated derivative of an amylaceous material resulting from the method, with a particle size of between 100 and 500 µm, has an angle of repose of between 30 and 50°, preferentially between 35 and 45°.

According to one particular embodiment of the invention, the solid composition of an acetylated derivative of an amylaceous material resulting from the method, with a particle size of between 100 and 500 µm, has an angle of fall of between 15 and 40°, preferentially between 25 and 35°.

According to the invention, the angles of repose and of fall are evaluated on the "POWDER CHARACTERISTICS TESTER" device sold by HOSOKAWA IRON WORKS, LTD. according to the protocol described in the instruction manual supplied with said device.

Compositions According to the Invention Compared with Those of the Prior Art.

According to the invention, the 100-500 µm particle size fractionation is carried out using the VS 1000 laboratory sieve shaker sold by the company RETSCH, according to the method recommended in the instructions leaflet for said sieve shaker. To do this, said sieve shaker is fitted with a sieving tower consisting of two sieves 20 cm in diameter, the mesh size of which is respectively 500 µm and 100 µm (these sieves are placed from top to bottom, from the widest mesh size to the narrowest mesh size). Briefly, the particle size fractionation consists in introducing the product at the top of the sieving tower and in starting the sieve shaker in continuous mode, at a vibration amplitude of 50%, for 10 minutes. After sieving for 10 minutes, the sieve shaker is stopped and the amount of product retained on the 100 µm sieve is recovered; it corresponds to a 100-500 µm particle size fraction.

Another subject of the invention is a composition that can be obtained by means of the method according to the invention.

Finally, the present invention relates to the use of a solid composition of an acetylated derivative of an amylaceous material as described above and/or obtained according to the method according to the invention, to prepare a thermoplastic, elastomeric, pharmaceutical, food, adhesive and/or ink composition.

The thermoplastic composition prepared from a composition according to the invention may also comprise one or more other thermoplastics.

The elastomeric composition prepared from a composition according to the invention may also comprise one or more other elastomeric materials.

The pharmaceutical composition prepared from a composition according to the invention may also comprise one or more other excipients.

The adhesive composition prepared from a composition according to the invention may also comprise one or more other adhesive materials.

A new means is thus available for efficiently preparing acetylated derivatives of an amylaceous material, including novel acetylated derivatives of an amylaceous material that can be used in a very large number of fields of application.

The applicant considers that this means, in the case in point the method as described above in all its variants, is advantageously applicable, in all generalities, to the preparation:
  a) of derivatives of an amylaceous material other than acetylated derivatives and in particular to derivatives resulting from an esterification reaction other than acetylation. The esterifying agent used to prepare such other esters of an amylaceous material may then be an organic acid anhydride other than acetic anhydride, an organic acid other than acetic acid, a mixed anhydride, an organic acid chloride or any mixture of these products. This esterification agent other than acetic anhydride and/or acetic acid may be chosen, for example, from saturated or unsaturated acids containing from 1 to 24 carbons, and more specifically from formic acid, propionic acid, butyric acid, valeric acid, hexanoic acid, heptanoic acid, pelargonic acid, octanoic acid, decanoic acid, undecanoic acid, lauric acid, myristic acid, palmitic acid, oleic acid and stearic acid, anhydrides of these acids, mixed anhydrides of these acids, and any mixtures of these products, but also
  b) of acetylated or other derivatives, resulting in particular from an esterification reaction other than acetylation, of polysaccharides other than amylaceous materials and in particular of acetylated or other derivatives of cellulose, hemicellulose, chitosans, alginates, xanthan gums, etc.

The examples which follow are given by way of nonlimiting illustration of the present invention.

Unless otherwise indicated, the percentages in the present application are expressed by weight relative to the total weight of the composition.

EXAMPLES

Example 1

Preparation of Acetylated Starch by Means of a Method Involving a LIST CRP and Comparison with a Conventional Method Processed:
Potato flour: 1800 g anhydrous+33 g of water (1.8% moisture content)=1833 g,
Acetic anhydride: 3400 g (3 equivalents, i.e. 100 mol % relative to the starch so as to obtain a theoretical DS of 3)+187 g (excess to compensate for the amount consumed by the hydrolysis)=3587 g
Acetic acid: 680 g,
Catalyst: methanesulfonic acid: 18 g,
Total mass: 6118 g
Reaction The acetic anhydride, the acetic acid, the potato flour and the catalyst are transferred into a LIST Co-Rotating-Processor (CRP) 10 Batch reactor/blender/evaporator, sold by the company LIST SA. The reaction is carried out for 1 hour 20 min at 130° C. During this step, the potato flour changes from a heterogeneous suspension to a homogeneous medium.

Next, 16.33 g of sodium acetate in solution in acetic acid are introduced into the reactor in order to neutralize the catalyst.

The product is cooled to 80° C., and the rotation speed is reduced from, respectively, 50 rpm and 40 rpm to, respectively, 5 rpm and 4 rpm for the two axles. The reactor is gradually placed under vacuum in order to distill-off the acetic acid and the residual traces of acetic anhydride; the pressure in the reactor goes, during this step, from atmospheric pressure to approximately 10 mbar.

A solid powder is gradually obtained. The temperature is brought back up to 120° C. in order to finish the elimination of the acetic acid. The distillation step lasts approximately 40 minutes. 2630 g of acetic acid are recovered at the level of the condenser, which represents more than 88% of the theoretical mass of 2970 g. It is possible to increase the acetic acid recovery yield by condensing the output of the vacuum pump in order to recover the rest of the acid.

The product obtained has a DS of 2.9 and a lack of acetic odor.

By way of comparison, the first example described in patent application WO 97/26281 (HOECHST CELANESE) is detailed hereinafter:

Processed:
Anhydrous starch: 30 g,
Acetic acid: (54+5) ml, i.e. 61.23 g,
Acetic anhydride: 54.99 ml, i.e. 59.50 g,
Catalyst: methanesulfonic acid: 0.38 ml, i.e. 0.56 g,
Total mass: 151.89 g.

At the end of the reaction, a DS of 3 is obtained and the reaction crude consists of the following products:
Starch acetate: 53.33 g,
Catalyst: methanesulfonic acid: 0.56 g,
Acetic anhydride: 2.83 g,
Acetic acid: 95.16 g,
Total mass: 151.89 g.

The precipitation ratio is 1/10, i.e. 1519 g, and the recovery yield is 87%. 46.42 g (46.42/53.33×100=87) of dry starch acetate are therefore recovered.

The principle waste therefore consists of a mixture containing:

6.91 g of nonprecipitated starch acetate, 0.56 g of methanesulfonic acid catalyst, 98.85 g of acetic acid (the acetic anhydride having hydrolyzed) and 1468.65 g of water.

The effluent to be retreated at the end of this method is 1624.8 g and contains only 6% of acetic acid for 46.42 g of starch acetate produced.

Example 2

Preparation, by Means of the Continuous Method According to the Invention, of Potato Flour-Based Maltodextrin Acetate with a Maximum Dextrose Equivalent (DE) of 5

First Step: Reaction
The following:
42.55 kg of potato flour-based maltodextrin with a maximum DE of 5, at 6% moisture content, i.e. 40 kg dry,
90 kg of acetic anhydride,
8 kg of sodium acetate,
are added cold
to a double-jacketed 1 m$^3$ reactor fitted with an IKA turbotron RFG 06-A stirrer and with a total reflux condenser system, the condenser having a heat-transfer fluid regulated at 18° C.

The heat regulation setpoint is set at 80° C. The reaction medium went from 13° C. to 81° C. in 14 minutes and then went from 81° C. to 135° C. in 1 minute. The reaction was self-sustaining for 26 minutes. The temperature of the reaction crude went from 135° C. to 131° C. before dropping, over the course of 2 minutes, from 131° C. to 122° C. and then stabilizing.

During the reaction period, vigorous boiling of the reaction medium took place with a large stream in the condenser.

During this reaction step, the suspension of maltodextrin in acetic anhydride was converted into a homogeneous solution of potato flour-based maltodextrin acetate with a maximum DE of 5, in acetic acid. The analysis of said acetate showed a DS of 3.0.

At the end of this step, 140.55 kg of reaction crude containing 71 kg of potato flour-based maltodextrin acetate with a maximum DE of 5 were obtained.

Second Step: Continuous-Mode Distillation of the Acetic Acid and Recovery of a Powder of Potato Flour-Based Maltodextrin Acetate with a Maximum DE of 5

This step is carried out entirely in a LIST CRP 25 CONTI reactor-blender-evaporator. This equipment is fitted:

with a circuit for placing under controlled reduced pressure, which has a condenser between the LIST device and the vacuum pump and a condenser at the output of the vacuum pump. The piping between the LIST device and the condenser is electrically traced at 120° C. in order to prevent any condensation of the acetic acid vapors and a return of liquid acetic acid to the LIST device;

with a supply line connecting the reactor, where the first step was carried out, to the LIST device. This supply line comprises a SEEPEX volumetric pump and a flash valve located as close to the LIST device as possible. All the piping is electrically traced;

with two independent oil-based heating circuits, each of 36 kW, regulating the temperature of the 3 independent bodies of the LIST device, of the two rotating shafts and of the declogging filter. All the components heated can be independently connected to either of the heating circuits;

with an overflow draining sill for removing the product from a product recovery tank with an airlock system which makes it possible to drain the tank without disrupting the vacuum in the equipment.

The acetic acid recovered in the condensers is sent to a tank which has an airlock in order to avoid disrupting the vacuum in the equipment.

The 2 heating circuits are regulated respectively at 130° C. and 120° C., the first body where the maltodextrin acetate solution is flashed is heated at 130° C., the rest of the apparatus is heated at 120° C.

The pressure in the circuit is regulated via the vacuum pump at 50 mbar. The rotational speed of the fast shaft was set at 20 revolutions per minute.

The supply pump supplies the LIST device through the flash valve at a flow rate of 20 liter/hour and a pressure of 4 bar. The maltodextrin acetate solution is maintained at 80° C. in the reactor and throughout the supply line by means of the electrical tracing.

The maltodextrin acetate solution is flashed in the LIST device and the formation of solid particles which are about a few cm in size is observed, said particles then being coarsely milled by the rotation of the two axles of the LIST device. The temperature of the product in the first zone, which is the zone where the flashing takes place, stabilizes at around 75° C., at about 100° C. in the second zone and about 108° C. in the third zone.

The powder is then milled and redispersed in water at 35% of dry matter, with the pH being adjusted using a solution of sodium hydroxide, and then filtered and washed by percolation in order to remove the catalyst and the traces of sodium acetate in a GUEDU filter before being dried in a GUEDU drier.

The product obtained has a DS of 3.0.

Example 3

Preparation of Acetylated Starch by Means of the Continuous Method According to the Invention The method is carried out in 2 independent main steps:
a reaction step in a reactor.
a solvent distillation step in a reactor-blender-evaporator.

The reaction step can be carried out according to several routes for obtaining starch acetate. The routes described below are not exhaustive.

Route A

In a reactor with a working volume of 1000 liters and a diameter of 950 mm, fitted with a 4 kW IKA TURBOTRON RGF 06-A stirrer and with a condenser, the following are reacted at atmospheric pressure:
- 100 kg, on a dry weight basis, of potato flour with a moisture content of 4% (4.17 kg of water),
- acetic anhydride: 3 equivalents relative to the amount of starch, i.e. 100 mol % so as to obtain a theoretical DS of 3, plus the amount consumed by the hydrolysis due to the water, i.e.: 188.89 kg 23.61 kg, in total 212.5 kg,
- catalyst: methanesulfonic acid: 1.00 kg (17 mol %).

The reaction is carried out for 30 minutes from the moment the reaction crude reaches the reaction temperature of 120° C. The reaction is stopped by neutralizing the catalyst with 0.90 kg of sodium acetate.

The reaction crude of approximately 260 liters that is obtained contains 175.2 kg of starch acetate with a DS equal to 2.90, 1.24 kg of the sodium salt of methanesulfonic acid, a mixture of acetic acid and acetic anhydride—an acetic acid fraction of approximately 10% is recovered in the condenser—and traces of sodium acetate (5% excess relative to the catalyst).

Route B:

In a reactor with a working volume of 1000 liters and a diameter of 950 mm, fitted with a 4 kW IKA TURBOTRON RGF 06-A stirrer and with a condenser in total reflux mode, the following are reacted at atmospheric pressure:
- 100 kg, on a dry weight basis, of potato flour with a moisture content of 4% (4.17 kg of water),
- acetic anhydride: 1.5 equivalents relative to the amount of starch, i.e. 50% of the molar amount so as to obtain a theoretical DS of 3, plus the amount consumed by the hydrolysis due to the water, i.e.: 94.44 kg+23.61 kg, in total 118.06 kg,
- acetic acid: 122.22 kg
- catalyst: methanesulfonic acid: 1.00 kg.

The reaction is carried out for 30 minutes from the moment the reaction crude reaches the reaction temperature of 120° C. The reaction is stopped by neutralizing the catalyst with 0.90 kg of sodium acetate.

The reaction crude of approximately 300 liters that is obtained contains 173.9 kg of starch acetate with a DS equal to 2.90, 1.24 kg of the sodium salt of methanesulfonic acid, acetic acid and traces of sodium acetate (5% excess relative to the catalyst).

Route C:

In a reactor with a working volume of 1000 liters and a diameter of 950 mm, fitted with a 4 kW IKA TURBOTRON RGF 06-A stirrer and with a condenser in total reflux mode, the following are reacted at atmospheric pressure:
- 100 kg, on a dry weight basis, of potato flour with a moisture content of 4% (4.17 kg of water),
- acetic anhydride: 100 mol % so as to obtain a theoretical DS of 3, plus the amount consumed by the hydrolysis due to the water, i.e.: 188.89 kg+23.61 kg, in total 212.5 kg,
- acetic acid: 172.22 kg,
- sodium acetate: 15.00 kg, The reaction is carried out for 7 hours from the moment the reaction crude reaches the boiling point, detected by the arrival of vapor in the condenser.

The reaction crude of approximately 440 liters that is obtained contains 168.7 kg of starch acetate with a DS of 2.65, 15 kg of sodium acetate and a mixture of acetic acid and acetic anhydride.

Distillation:

The distillation step takes place in a LIST CRP 25 continuous reactor-blender-evaporator. The reaction crude comes from one of routes A, B or C previously described.

The 2 heating circuits of the LIST device are regulated respectively at 130° C. and 120° C., the first body where the potato flour acetate solution is flashed is heated at 130° C., the rest of the apparatus is heated at 120° C.

The pressure in the circuit is regulated via the vacuum pump at 50 mbar. The rotational speed of the fast shaft was set at 20 revolutions per minute.

The supply pump supplies the LIST device through the flash valve at a flow rate of 20 liters/hour and a pressure of 4 bar. The potato flour acetate solution is maintained at 120° C. in the reactor and throughout the supply line by means of the electrical tracing.

At the end of distillation, the product is coarsely milled and removed from the apparatus via an airlock system.

The reactor-blender-evaporator has two distinct temperature zones: the first, in the supply and distillation zone of the reactor, is relatively low and must be below the Tg (glass transition temperature) of the product, thereby making it possible to obtain a powder which is mechanically brittle and not a rubbery product which is very difficult, or even impossible, to work mechanically; the second, in the milling and solvent-depletion zone, must be higher, thereby making it possible to continue to solvent-deplete the reaction medium solidified.

The product at the output of the reactor-blender-evaporator contains all of the starch acetate plus the catalyst in the form of sodium acetate and/or of methanesulfonic acid sodium salt and traces of acetic acid and acetic anhydride.

The intermediate steps, before recovery of the final composition of amylaceous material ester, are fine milling, washing in a minimum amount of water in order to obtain the desired purity characteristics, and drying.

Example 4

Solubility of the Various Acetates of Acetylated Derivatives in Solution at 10% in Acetic Acid In order to evaluate the threshold DS above which the acetylated derivatives of an amylaceous material are soluble in acetic acid, a test sample of 1 g of various acetates of acetylated derivatives was placed in solution in 9 g of acetic acid (solution at 10%) in a closed test tube. The test tube was placed in an incubator at 100° C. and was agitated manually and periodically for 5 minutes. The solubilization of the acetylated derivatives was evaluated according to whether or not the acetylated derivatives/acetic acid mixture forms a homogeneous adhesive phase.

| Product | DS | Soluble |
| --- | --- | --- |
| Potato flour acetate | 0.7 | no |
| Potato flour acetate | 0.8 | no |
| Potato flour acetate | 0.9 | no |
| Potato flour acetate | 1.4 | no |
| Potato flour acetate | 1.5 | no |
| Potato flour acetate | 1.6 | yes |
| Fluidified pea starch acetate | 1.7 | yes |
| Pregelatinized and crosslinked potato flour acetate (crosslinking rate of 100) | 1.7 | yes |
| Waxy corn starch acetate (DE 2) | 1.8 | yes |

The threshold DS above which the acetylated derivatives of an amylaceous material are soluble in acetic acid and/or anhydride corresponds to a DS at least greater than 1.6.

Example 5

Characteristics of Solid Compositions of Acetylated Derivatives According to the Invention Various compositions obtained according to the method of the invention were characterized after having been washed with water.

These compositions were compared with the starch acetate powders conventionally described: starch acetate powders (AAPS PharmasciTech 2002; 3(4) article 34 (http://www.aapspharmascitech.org) Effects of Physical Properties of Starch Acetate Powders on Tableting).

| Acetylated derivatives base | DS | Aerated bulk density | Packed bulk density | Flowability (seconds) | Specific surface area (m²/g) |
|---|---|---|---|---|---|
| Maltodextrin with a DE of 1, derived from potato flour | 2.9 | 0.55 | 0.68 | 5-6 | 0.75 |
| Pregelatinized and crosslinked potato flour (crosslinking rate of 100) | 2.8 | 0.61 | 0.72 | 6-5 | 0.75 |
| Maltodextrin with a DE of 2, derived from a waxy corn starch | 2.7 | 0.65 | 0.79 | 5-6 | 0.40 |
| Potato flour | 2.7 | 0.63 | 0.79 | 4-4 | 0.30 |
| Starch acetate powders | | 0.29-0.44 | 0.39-0.56 | | 4.8-10.5 |

The compositions according to the present invention have an aerated packed density and an aerated packed density which are much higher than those of the starch acetate powders conventionally described. The compositions of the present invention also have a flow time of between 3 and 7 seconds. Furthermore, compared with the starch acetate powders conventionally described, the compositions according to the present invention have a much smaller specific surface area, preferentially between 0.1 and 1.0 m²/g, even more preferentially between 0.2 and 0.9 m²/g.

The compositions according to the invention were also characterized on a particle size fraction of said compositions (only the fraction of the compositions according to the invention having a particle size of between 100 and 500 µm was retained). The results on such a particle size fraction are the following:

| Base | DS | Aerated bulk density | Packed bulk density | Packing (%) | Angle of repose (°) | Angle of fall (°) |
|---|---|---|---|---|---|---|
| Maltodextrin with a DE of 1, derived from potato flour | 2.9 | 0.53 | 0.58 | 9.4 | 39-40 | 24-26 |
| Pregelatinized and crosslinked potato flour (crosslinking rate of 100) | 2.8 | 0.61 | 0.65 | 5.5 | 41-42 | 26-32 |
| Maltodextrin with a DE of 2, derived from a waxy corn starch | 2.7 | 0.58 | 0.64 | 8.9 | 38-39 | 29-29 |
| Potato flour | 2.7 | 0.58 | 0.64 | 10.7 | 39-40 | 25-26 |

The invention claimed is:

1. A solid composition of an acetylated derivative of an amylaceous material which has a degree of substitution (DS) with acetyl groups of between 2.5 and 3 and which has:
   an aerated bulk density of greater than 0.4 g/cc; and
   a packed bulk density of greater than 0.5 g/cc.

2. A method for preparing the solid composition of an acetylated derivative of an amylaceous material of claim 1 comprising:
   a) acetylation of an amylaceous material with acetic anhydride and/or acetic acid in the presence of a catalyst to obtain a reaction medium in the form of an adhesive of an acetylated amylaceous material,
   b) optionally neutralizing said catalyst,
   c) evaporation of the reaction medium and solidifying said reaction medium; and
   d) recovery of the evaporated, solidified reaction medium.

3. A solid composition of an acetylated derivative of an amylaceous material which has a degree of substitution (DS) with acetyl groups of between 1.6 and 3 and which has:
   an aerated bulk density of between 0.4 and 0.8 g/cc; and
   a packed bulk density of between 0.5 and 0.9 g/cc.

4. The solid composition of an acetylated derivative of an amylaceous material of claim 3 which has a specific surface area of between 0.1 and 1.0 m²/g.

5. The solid composition of an acetylated derivative of an amylaceous material of claim 3, which has a flow time of between 2 and 10 seconds, said flow time is evaluated according to a test A consisting of:
   providing an apparatus consisting of a funnel with an angle of 60° C. and a diameter of 125 nm as described in FIG. 2.9.19-2 of the European Pharmacopea;
   maintaining said funnel upright and its flow orifice blocked by suitable means;
   introducing a test sample of 100 g of product without compacting it;
   unblocking the flow orifice;
   measuring the time needed for the entire test sample to flow out of the funnel;
   carrying out three different determinations; and
   expressing the flowability in seconds, related to 100 g of test sample.

6. A composition comprising a solid composition according to claim 3 and a thermoplastic material, elastomeric material, pharmaceutical excipient or adhesive material.

7. A composition comprising a solid composition of an acetylated derivative produced by a process comprising:
   a) acetylation of an amylaceous material with acetic anhydride and/or acetic acid in the presence of a catalyst to obtain a reaction medium in the form of an adhesive of an acetylated amylaceous material,
   b) optionally neutralizing said catalyst,
   c) evaporation of the reaction medium and solidifying said reaction medium; and
   d) recovery of the evaporated, solidified reaction medium, said acetylated derivative having a degree of substitution (DS) with acetyl groups of between 1.6 and 3 and having:
an aerated bulk density of between 0.4 and 0.8 g/cc; and
a packed bulk density of between 0.5 and 0.9 g/cc.

8. The composition of claim 7, wherein the catalyst of step a) is methanesulfonic acid or sodium acetate.

9. The composition of claim 7, wherein step a) is carried out under at least one of the following conditions:
in the presence of n equivalents of acetic anhydride (or acid) relative to the amount of amylaceous material, so as to obtain a degree of substitution (DS) of acetyl groups in the region of x, x being a number between 1.6 and 3;
in the presence of from 0.0002 to 0.50 molar equivalent of catalyst relative to the amount of amylaceous material calculated in moles of anhydroglucose;
at a setpoint temperature of between 80 and 135° C., for a reaction at atmospheric pressure; and/or
for a period ranging from 5 seconds to 10 hours from the moment the setpoint temperature is reached.

10. The composition of claim 7, wherein step b) is carried out under at least one of the following conditions:
in the presence of an amount greater than 0.8 molar equivalent of neutralization reagent, relative to the amount of catalyst;
under the same temperature and pressure conditions as step a); and/or
for a period ranging from 30 seconds to 10 hours from the moment the neutralization reagent is added.

11. The composition of claim 7, wherein the reaction medium subjected to step c) is in the form of an adhesive of an acetylated amylaceous material having a proportion of dry matter greater than 20% by weight of the total reaction mixture.

12. The composition of claim 7, wherein step c) is carried out at a pressure of between 0.001 and 1 bar.

13. The composition of claim 7, wherein step c) is carried out at a temperature of between 20 and 140° C.

14. The composition of claim 7, wherein steps c) and d) and any optional intermediate milling step are carried out in the same chamber.

15. The composition of claim 7, wherein the chamber in which step c), optionally step d) and/or any intermediate milling step is carried out is fitted with stirring means that have a horizontal rotational axis.

16. The composition of claim 15, wherein the chamber in which step c) is carried out is fitted with stirring means that are designed so as to scrape the wall of said chamber.

17. The composition of claim 15, wherein the chamber in which step c) is carried out is a uniaxial or biaxial chamber fitted with blades and with mixing or blending components.

18. The composition of claim 7, wherein step c) and optionally step d) is carried out in a biaxial chamber.

* * * * *